United States Patent
Griffith

(10) Patent No.: US 6,378,213 B1
(45) Date of Patent: Apr. 30, 2002

(54) PISTACHIO SHELLER

(76) Inventor: Elvera C. Griffith, 505 E. Mariners Pointe, Fresno, CA (US) 93720

( * ) Notice: Subject to any disclaimer, the term of this patent is extended or adjusted under 35 U.S.C. 154(b) by 0 days.

(21) Appl. No.: 09/626,032

(22) Filed: Jul. 27, 2000

(51) Int. Cl.[7] .................................................. A47J 43/26
(52) U.S. Cl. ..................................... 30/120.2; 30/120.1
(58) Field of Search ............................. 30/120.1, 120.2, 30/113.1; 99/568; D7/680, 693

(56) References Cited

U.S. PATENT DOCUMENTS

| | | | | |
|---|---|---|---|---|
| 964,414 | A | * | 7/1910 | Fort et al. ................... 30/120.2 |
| 1,201,953 | A | * | 10/1916 | Fort ............................ 30/120.2 |
| 1,274,856 | A | * | 8/1918 | Cook .......................... 30/120.2 |
| 1,556,424 | A | * | 10/1925 | Cook .......................... 30/120.2 |
| 2,590,953 | A | * | 4/1952 | Gendler ...................... 30/120.2 |
| 3,349,821 | A | * | 10/1967 | Moeller ...................... 30/120.2 |
| 3,924,326 | A | * | 12/1975 | Di Gaetano ............... 30/120.2 |
| 4,317,281 | A | | 3/1982 | Yowa |
| 4,462,156 | A | | 7/1984 | Himelhoch |
| 4,520,719 | A | * | 6/1985 | Price ......................... 30/120.2 |
| 5,070,617 | A | * | 12/1991 | Fredericksen et al. .... 30/120.2 |
| 5,097,597 | A | | 3/1992 | Bianchi |
| 5,233,747 | A | * | 8/1993 | Johnson .................... 30/120.2 |
| 5,339,524 | A | | 8/1994 | Sawyer |
| 5,533,265 | A | * | 7/1996 | Samuelson ................ 30/120.2 |
| 6,041,697 | A | * | 3/2000 | Maoz ......................... 30/120.2 |
| 6,237,476 | B1 | * | 5/2001 | Beauchemin ............. 30/120.2 |

* cited by examiner

Primary Examiner—M. Rachuba
Assistant Examiner—Kim Ngoc Tran
(74) Attorney, Agent, or Firm—Henderson & Sturm LLP

(57) ABSTRACT

A pistachio sheller including a base having an upwardly extending shaft with a flat narrow blade adapted to be received in the crack of a pistachio shell. A cylinder is rotatably attached to the base and includes an oval-shaped top opening adjacent the flat narrow tip. A pistachio shell is received in the oval opening with the crack directed down to engage the blade. Rotation of the base with respect to the cylinder splits the pistachio shell open.

4 Claims, 1 Drawing Sheet

PISTACHIO SHELLER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of food preparation utensils, and more particularly to a hand-held opener adapted to remove the shells from pistachio nuts.

2. Description of Related Art

As can be seen by reference to the following U.S. Pat. Nos. 4,317,281; 4,462,156; 5,097,597 and 5,339,524, the prior art is replete with myriad and diverse nut shellers and openers.

While all of the aforementioned prior art constructions are more than adequate for the basic purpose and function for which they have been specifically designed, they are uniformly deficient with respect to their failure to provide a simple, efficient, and practical pistachio nut sheller.

As a consequence of the foregoing situation, there has existed a longstanding need for a new and improved pistachio nut sheller and the provision of such a construction is a stated objective of the present invention.

BRIEF SUMMARY OF THE INVENTION

Briefly stated, the present invention provides a pistachio sheller including a base having an upwardly extending shaft with a flat narrow blade adapted to be received in the crack of a pistachio shell. A cylinder is rotatably attached to the base and includes an oval-shaped top opening adjacent the flat narrow tip. A pistachio shell is received in the oval opening with the crack directed down to engage the blade. Rotation of the base with respect to the cylinder splits the pistachio shell open.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
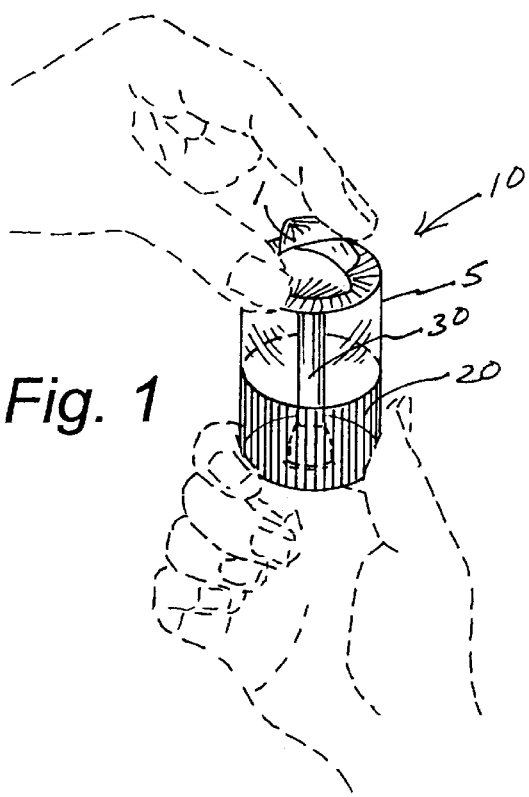
FIG. 1 is a perspective view of the pistachio sheller of the present invention.
Figure 2:
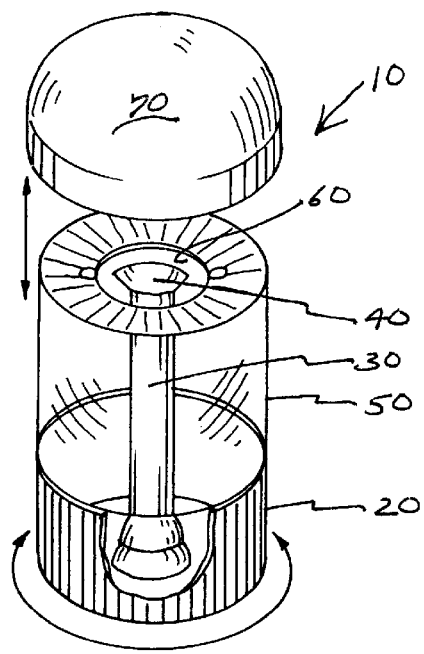
FIG. 2 is an exploded perspective view illustrating the cap covering the cylinder and having portions cut away to show the shaft attached to the base.
Figure 3:
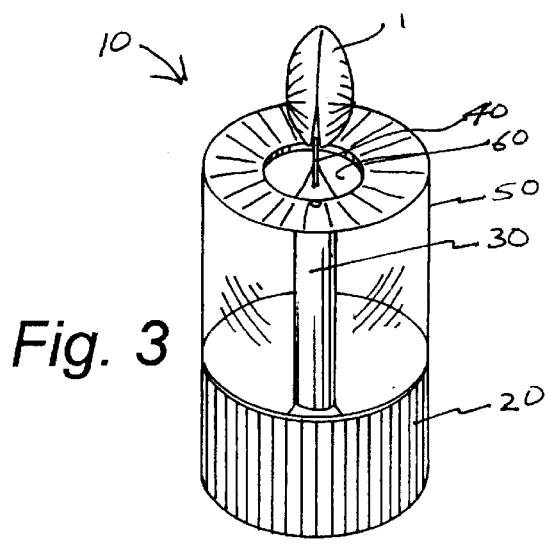
FIG. 3 is a perspective view showing a pistachio shell positioned on the flat narrow blade at the beginning of the shelling process.
Figure 4:
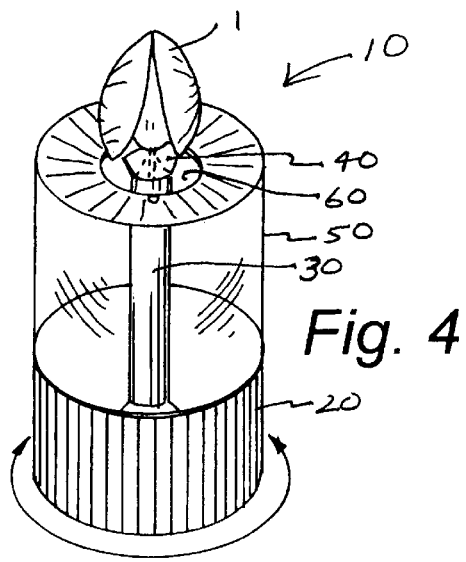
FIG. 4 is a perspective view showing the pistachio shell split open by the blade as the base is rotated with respect to the cylinder.

As can be seen by reference to the drawings, and in particularly to FIG. 1, the pistachio nut sheller that forms the basis of the present invention is designated generally by the reference number 10. The sheller 10 includes a base 20 having an attached upwardly extending shaft 30 with a flat narrow blade 40 that is adapted to be received in the crack of a pistachio shell 1. A cylinder 50 is rotatably attached to the base 20. The cylinder 50 has an oval-shaped top opening 60 disposed adjacent the blade 40. When a pistachio shell is placed on the oval-shaped top opening 60, the blade 40 engages the crack.

Once the pistachio shell 1 is placed over the opening 60 and the blade 40 engages the crack, one hand is used to hold the pistachio shell 1 down while the other hand rotates the base 20 with respect to the cylinder 50. Since the blade 40 is attached to the base 20, it turns and easily splits the pistachio shell 1 wide open. The cap 70 provides aesthetics and safety since it fits over the top of the cylinder 50 and covers the blade 40.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A pistachio sheller comprising:

a base;

an elongated shaft fixedly attached to, surrounded by, and extending up from the base, the shaft having a flat narrow blade disposed to be received in a crack of a pistachio shell;

a cylinder fixedly yet rotatably attached to the base and having a top opening defining a bearing surface disposed adjacent the blade of the shaft, the top opening being adapted to receive the pistachio shell with the crack directed downwardly to engage the blade of the shaft whereby rotation of the base with respect to the cylinder splits the pistachio shell open as the bearing surface supports the pistachio shell and/or the user's fingers positioning the crack in the pistachio shell relative to the blade.

2. The pistachio sheller of claim 1 wherein the opening in the cylinder is oval in shape.

3. The pistachio sheller of claim 2 further including a cap selectively disposed over the cylinder to cover to the opening.

4. The pistachio sheller of claim 1 further including a cap selectively disposed over the cylinder to cover the top opening.

* * * * *